(12) United States Patent
Benazzi et al.

(10) Patent No.: US 7,449,421 B2
(45) Date of Patent: *Nov. 11, 2008

(54) CATALYST AND ITS USE FOR IMPROVING THE POUR POINT OF HYDROCARBON CHARGES

(75) Inventors: Eric Benazzi, Chatou (FR); Emmanuelle Guillon, Saint Genis Laval (FR); Johan Martens, Huldenberg (BE)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 589 days.

This patent is subject to a terminal disclaimer.

(21) Appl. No.: 10/807,459

(22) Filed: Mar. 24, 2004

(65) Prior Publication Data

US 2005/0130833 A1    Jun. 16, 2005

(30) Foreign Application Priority Data

Mar. 24, 2003    (FR)    .................................. 03 03531

(51) Int. Cl.
- *B01J 29/06* (2006.01)
- *B01J 21/00* (2006.01)
- *B01J 29/00* (2006.01)
- *B01J 21/16* (2006.01)
- *C10G 73/02* (2006.01)
- *C10G 45/00* (2006.01)

(52) U.S. Cl. ............................ 502/67; 502/66; 502/74; 502/84; 208/28; 208/89

(58) Field of Classification Search .................. 502/66, 502/67, 74, 84; 208/28, 89
See application file for complete search history.

(56) References Cited

U.S. PATENT DOCUMENTS

| | | | |
|---|---|---|---|
| 7,250,106 B2 * | 7/2007 | Benazzi et al. | 208/49 |
| 7,282,465 B2 * | 10/2007 | Benazzi et al. | 502/64 |
| 2004/0065585 A1 * | 4/2004 | Benazzi et al. | 208/27 |

FOREIGN PATENT DOCUMENTS

| | | | |
|---|---|---|---|
| EP | 0 046 504 | | 3/1982 |
| EP | 0 065 400 | * | 5/1982 |
| EP | 0 785 021 | | 7/1997 |
| EP | 0 962 251 | | 12/1999 |
| WO | 01 64339 | | 9/2001 |
| WO | 02 48289 | | 6/2002 |
| WO | 02 48290 | | 6/2002 |
| WO | WO 02/48289 | * | 6/2002 |

* cited by examiner

*Primary Examiner*—Jerry Lorego
*Assistant Examiner*—Patricia L Hailey
(74) *Attorney, Agent, or Firm*—Millen, White, Zelano & Branigan, P.C.

(57) ABSTRACT

A catalyst comprising at least one zeolite (molecular sieve) chosen from the group formed by the TON structure type zeolites (Theta-1, ZSM-22, ISI-1, NU-10 and KZ-2) and at least one zeolite chosen from the group formed by the zeolites (ZSM-48, EU-2, EU-11 and ZBM-30), at least one porous mineral matrix, at least one hydro-dehydrogenating element, preferably chosen from the elements of Group VIB and Group VIII of the periodic table, is used for the conversion of hydrocarbons, in particular for the reduction of the pour point of charges containing long (more than 10 carbon atoms) linear and/or slightly branched paraffins, in particular in order to convert, with a good yield, charges having high pour points to at least one cut having a low pour point and a high viscosity index for oil bases.

20 Claims, No Drawings cross-reference to related
applications

CATALYST AND ITS USE FOR IMPROVING THE POUR POINT OF HYDROCARBON CHARGES

CROSS-REFERENCE TO RELATED APPLICATIONS

This application relates to Applicants' concurrently filed U.S. applications, "Catalyst Comprising at Least One Zeolite Chosen from ZBM-30, SM-48 EU-2 and EU-11 and at Least one Y Zeolite and Process of Hydroconversion of Hydrocarbon Charges Using Such a Catalyst" (French priority 03/03.529 filed Mar. 24, 2003) and, "Catalyst and Its Use for Improving the Pour Point of Hydrocarbon Charges" (French priority 03/03.530 filed Mar. 24, 2003), now U.S. Pat. No. 7,282,465 B2, issued Oct. 16, 2007.

The present invention relates to a process for improving the pour point of charges containing long (more than 10 carbon atoms) linear and/or slightly branched paraffins, in particular in order to convert, with a good yield, charges having high pour points to at least one cut having a low pour point and a high viscosity index for the oil bases.

A subject of the present invention is also a catalyst comprising at least one zeolite, (molecular sieve) chosen from the group formed by the TON structure type zeolites (Theta-1, ZSM-22, ISI-1, NU-10 and KZ-2) and at least one ZBM-30 zeolite preferably synthesized in the presence of a particular structuring agent such as triethylenetetramine, at least one porous mineral matrix, at least one hydro-dehydrogenating element, preferably chosen from the elements of Group VIB and Group VIII of the periodic table, and its use for the conversion of hydrocarbons and the process for reducing the pour point with this catalyst.

PRIOR ART

High-quality lubricants are of fundamental importance for the satisfactory operation of modern machinery, cars and lorries. However, the quantity of untreated paraffins originating directly from petroleum, and having suitable properties for constituting good lubricants is very small compared with the growing demand in this sector.

The treatment of heavy petroleum fractions with high linear or slightly branched paraffins contents is necessary in order to obtain high-grade base oils with the best possible yields, by an operation aimed at eliminating the linear or very slightly branched paraffins, from charges which will then be used as base oils or as kerosene or jet fuel.

In fact paraffins with a high molecular weight, which are linear or very slightly branched and which are present in oils or in the kerosene or jet fuel lead to high pour points and therefore to solidification phenomena for low-temperature uses. In order to reduce the pour points, these linear, unbranched or very slightly branched paraffins must be entirely or partially eliminated.

This operation can be carried out by extraction using solvents such as propane or methyl ethyl ketone, which is called propane or methyl ethyl ketone (MEK) dewaxing. However, these techniques are expensive, lengthy and not always easy to implement.

Another means is selective cracking of the longest linear paraffin chains which leads to the formation of compounds with a lower molecular weight, some of which can be eliminated by distillation.

Given their form selectivity, zeolites are among the most widely-used catalysts. The idea underlying their use is that zeolitic structures exist, the pore openings of which are such that they allow the entry of the long linear or very slightly branched paraffins into their micropores, but exclude branched paraffins, naphthenes and aromatics. This phenomenon thus leads to a selective cracking of the linear or very slightly branched paraffins.

Catalysts based on zeolites having intermediate pore sizes such as ZSM-5, ZSM-11, ZSM-12, ZSM-22, ZSM-23, ZSM-35 and ZSM-38 have been described for their use in these processes in particular in the patents U.S. Pat. Nos. 3,894,938; 4,176,050; 4,181,598; 4,222,855; 4,229,282 and 4,247,388.

Mixtures of zeolites with large pores and these zeolites with intermediate pores which can be used in a dewaxing process are described in Patent Application WO-A-02/08 8279.

Moreover, it was found that processes using these zeolites (ZSM-5, ZSM-11, ZSM-12, ZSM-22, ZSM-23, ZSM-35 and ZSM-38) make it possible to obtain oils by cracking of charges containing quantities of linear or very slightly branched paraffins of less than 50% by weight. However, for charges containing higher quantities of these compounds it transpired that their cracking leads to the formation of large quantities of products with lower molecular weights, such as butane, propane, ethane and methane, which considerably reduces the yield of sought products.

In order to remedy these drawbacks, the applicant concentrated his research on the developing of catalysts comprising at least one zeolite (molecular sieve) chosen from the group formed by the TON structure type zeolites (Theta-1, ZSM-22, ISI-1, NU-10 and KZ-2) and at least one zeolite chosen from the group formed by the zeolites (ZSM-48, EU-2, EU-11 and ZBM-30), at least one hydro-dehydrogenating element, preferably chosen from the elements of Group VIB and Group VIII of the periodic table. The Applicant then surprisingly discovered that the use of a catalyst comprising at least one TON structure type zeolite and at least one ZBM-30 zeolite synthesized with a particular structuring agent such as triethylenetetramine makes it possible to reduce the pour point of the charge while still obtaining a high viscosity index (VI) and maintaining a good yield of desired products. The present invention proposes a catalytic process for reducing the pour point, based on such catalysts.

SUBJECT OF THE INVENTION

A first subject of the invention is a catalyst comprising at least one zeolite (molecular sieve) chosen from the group formed by the TON structure type zeolites (Theta-1, ZSM-22, ISI-1, NU-10 and KZ-2) and at least one ZBM-30 zeolite preferably synthesized with a particular structuring agent such as triethylenetetramine, at least one hydro-dehydrogenating element, preferably chosen from the elements of Group VIB and Group VIII of the periodic table.

Another subject of the invention is a process for improving the pour point of a paraffinic charge comprising paraffins with more than 10 carbon atoms in which the charge to be treated is brought into contact with a catalyst comprising at least one zeolite (molecular sieve) chosen from the group formed by the TON structure type zeolites (Theta-1, ZSM-22, ISI-1, NU-10 and KZ-2) and at least one ZBM-30 zeolite synthesized with a particular structuring agent such as triethylenetetramine, at least one hydro-dehydrogenating element, preferably chosen from the elements of Group VIB and Group VIII of the periodic table, at least one porous mineral matrix, at a temperature between 200 and 450° C., a pressure between 0.1 and 25 MPa and an hourly volume rate between 0.05 and 30 h$^{-1}$ in the presence of hydrogen at a level of 50 to 2000 normal liters of hydrogen per liter of charge (Nl/l).

The zeolites comprised in the catalyst according to the invention which are of the TON structure type are described in "Atlas of Zeolite Structure Types", W. M. Meier, D. H. Olson and Ch. Baerlocher, 4$^{th}$ Revised edition, 1996, Elsevier.

The synthesis of the ZBM-30 zeolite is described in the patent EP-A-46504.

Unexpectedly, said catalyst has a greater dewaxing activity and selectivity (improvement of the pour point) than the zeolites-based catalytic formulae (molecular sieve) known from the prior art.

Advantageously, this process makes it possible to convert a charge having a high pour point to a product having a tower pour point. It is therefore applicable for reducing the pour point of the gasoils for example. It also makes it possible to reduce the pour point of heavier charges in order to obtain oil bases having good cold-weather properties and a high viscosity index.

The charges which can be treated according to the process of the invention are advantageously fractions having relatively high pour points, the value of which it is wished to reduce.

Typical charges which can be treated advantageously according to the invention generally have a pour point above 0° C. The products resulting from the treatment according to the process have pour points below 0° C. and preferably below approximately −10° C.

The charges which can be treated according to the process of the invention contain paraffins, olefins, naphthenes, aromatics and also possibly organic nitrogen, sulphur and oxygen compounds.

The paraffins resulting from the Fischer-Tropsch process are excluded.

The use of the catalyst according to the invention under the conditions described above allows, in particular, the production of products having a low pour point with good yields, and a high viscosity index in the case of the heaviest fractions which are treated with a view to producing oil bases.

DETAILED DESCRIPTION OF THE INVENTION

The catalyst according to the invention comprises at least one zeolite chosen from the group formed by the TON structure type zeolites and at least one ZBM-30 zeolite preferably synthesized with a particular structuring agent such as triethylenetetramine, at least one hydro-dehydrogenating element, preferably chosen from the elements of Group VIB and Group VII (preferably the noble metals of Group VIII) of the periodic table and at least one porous mineral matrix.

The TON structure type zeolite contained in the composition of the catalyst is chosen from the group formed by the zeolites Theta-1, ISI-1, NU-10, KZ-2 and ZSM-22 described in "Atlas of Zeolite Structure Types", W. M. Meier, D. H. Olson and Ch. Baerlocher, 4$^{th}$ Revised edition, 1996, Elsevier, and in the patents U.S. Pat. Nos. 4,556,477 and 4,902,406 with regard to the ZSM-22 zeolite and in the patents EP-65 400 and EP-7624 for the NU-10 zeolite.

The synthesis of the ZBM-30 zeolite is described in the patent EP-A-46504.

Preferably the NU-10, ZSM-22 and ZBM-30 zeolites are used. The ZBM-30 zeolite is preferably synthesized according to the methods described in the patent EP-A-46504 according to the procedure using the structuring agent triethylenetetramine.

The overall Si/Al ratio of the zeolites contained in the composition of the catalysts according to the invention as well as the chemical composition of the samples are determined by X-ray fluorescence and atomic absorption.

The Si/Al ratios of the zeolites described above are those obtained during the synthesis according to the procedures described in the various documents cited or obtained after post-synthesis dealumination treatments well known to a person skilled in the art, such as, non-exhaustively, hydrothermal treatments followed or not followed by acid attacks or also direct acid attacks by solutions of mineral or organic acids.

The zeolites contained in the composition of the catalyst according to the invention are calcined and exchanged by at least one treatment with a solution of at least one ammonium salt in order to obtain the ammonium form of the zeolites which, once calcined, lead to the hydrogen form of the zeolites.

The zeolites contained in the composition of the catalyst according to the invention are at least in part, preferably practically totally, in acid form, i.e. in the hydrogen form (H$^+$). The Na/T atomic ratio is generally less than 10% and preferably less than 5% and even more preferably less than 1%.

On the other hand, the catalyst forming the subject of the invention contains at least one hydro-dehydrogenating element, preferably chosen from the elements of Group VIB and Group VIII (i.e. metal or compound) of the periodic table and at least one porous mineral matrix.

In the case where the element is at least one metal of Group VIII, preferably when it is a noble metal and advantageously a noble metal chosen from the group formed by platinum and palladium, it can be introduced onto the zeolites for example by dry impregnation, by ion exchange or any other process known to a person skilled in the art, or indeed it can be introduced onto the matrix.

According to a first variant, prior to their shaping, at least one of the zeolites previously described is subjected to the application of at least one metal of Group VIII, preferably chosen from the group formed by platinum and palladium. The zeolites thus charged with metals are mixed. The mixture of these zeolites which are then in powder state is carried out with any powder-mixing technique known to a person skilled in the art.

Once the mixture of the zeolite powders, charged with metals, is carried out, the mixture is shaped by any technique known to a person skilled in the art. It can in particular be mixed with a matrix, generally amorphous, for example a moist alumina gel powder. The mixture is then shaped, for example by extrusion through a die.

The shaping can be carried out with matrices other than alumina, such as for example magnesia, amorphous silica-aluminas, natural clays (kaolin, bentonite, sepiolite, attapulgite), silica, titanium oxide, boron oxide, zirconium, aluminium phosphates, titanium phosphates, zirconium phosphates, charcoal and their mixtures. It is preferred to use matrices containing alumina, in all its forms known to a person skilled in the art, and still more preferably aluminas, for example gamma alumina. Techniques other than extrusion, such as pelleting and dragée production, can be used.

Mixtures of alumina and silica, mixtures of alumina and silica-alumina can also advantageously be used.

The catalysts obtained by the present invention are shaped in the form of grains of different forms and dimensions. They are generally used in the form of cylindrical or polylobate extrudates such as straight or twisted bilobates, trilobates, polylobates, but can optionally be produced and used in the form of crushed powder, tablets, rings, beads, coils.

After the shaping stage, the product obtained is subjected to a drying stage, then to a calcination stage.

In the case where the hydrogenating metal is a noble metal of Group VIII, and preferably platinum and/or palladium, it can also and advantageously be applied to the support after the shaping of the zeolite which is free of metals, using any process known to a person skilled in the art and allowing the application of the metal to the molecular sieve. In this case the support is obtained in a manner analogous to that described previously.

In the remainder of the text, the term support will be used to describe the mixture of zeolites (free of metals), plus the matrix after shaping, drying and calcination, for example as obtained previously.

In order to apply the metal to the zeolites, it is possible to use the cation exchange technique with competition where the competitor is preferably ammonium nitrate, the competition ratio being at least equal to approximately 20 and advantageously approximately 30 to 200. In the case of platinum or palladium, a tetramine complex of platinum or a tetramine complex of palladium is customarily used: these latter will then be applied practically totally to the zeolite. This cation exchange technique can also be used in order to apply the metal directly to the molecular sieve powder, before its optional mixing with a matrix.

The application of the metal (or metals) of Group VIII is generally followed by calcination under air or oxygen, usually between 300 and 600° C. for 0.5 to 10 hours, preferably between 350 and 550° C. over 1 to 4 hours. Reduction under hydrogen can then be carried out, generally at a temperature between 300 and 600° C. for 1 to 10 hours, preferably operating between 350 and 550° C. for 2 to 5 hours.

It is also possible to apply the platinum and/or palladium no longer directly to the molecular sieves, but to the matrix (for example the aluminium binder) of the support, before or after the shaping stage, implementing an anion exchange with hexachloroplatinic acid, hexachloropalladic acid and/or palladium chloride in the presence of a competing agent, for example hydrochloric acid. Generally after the application of platinum and/or palladium, the catalyst is, as previously, subjected to calcination then reduced under hydrogen as indicated above.

The support of the catalyst of the present invention generally covers the following matrix and zeolites contents:

5 to 95% by weight, preferably 10 to 90% by weight, more preferably 15 to 85% by weight and very preferably 20 to 80% by weight of zeolites such that at least one zeolite is chosen from the group formed by the TON structure type zeolites (Theta-1, ZSM-22, ISI-1, NU-10 and KZ-2) and at least one zeolite is a ZBM-30 zeolite, 5 to 95%, preferably 10 to 90% by weight, more preferably 15 to 85% and very preferably 20 to 80% by weight of at least one amorphous or poorly crystallized oxide-type porous mineral matrix.

The distribution between the two zeolites of each of the groups defined previously is such that the zeolite(s) content chosen from the group formed by the TON structure type zeolites (Theta-1, ZSM-22, ISI-1, NU-10 and KZ-2) can vary from 1 to 99% preferably from 5 to 95% and even more preferably can vary between 10 and 90%, in relative percentages of all of the zeolites introduced into the catalyst. In the same way the ZBM-30 zeolite content varies from 1 to 99% preferably from 5 to 95% and even more preferably varies between 10 and 90%, in relative percentages, of all of the zeolites introduced into the catalyst.

The noble metal(s) content thus optionally introduced, expressed as a percentage by weight relative to the total mass of the catalyst, is generally below 5%, preferably below 3%, still more preferably below 2% and generally below 1% by weight.

In the case where the catalyst comprises a hydrogenating metal of Group VIII, preferably a noble metal and advantageously platinum and/or palladium, the catalyst is generally reduced in the reactor in the presence of hydrogen and under conditions well known to a person skilled in the art.

In the case where the hydrogenating metal is not a noble metal, the elements of Group VIB and Group VIII optionally introduced into the catalyst according to the invention can be present totally or partially in metal and/or oxide and/or sulphide form.

Among the elements of Group VIB, molybdenum and tungsten are preferred.

The sources of elements of Group VIB which can be used are well known to a person skilled in the art. For example, among the sources of molybdenum and tungsten, it is possible to use oxides and hydroxides, molybdic and tungstic acids and their salts, in particular ammonium salts such as ammonium molybdate, ammonium heptamolybdate, ammonium tungstate, phosphomolybdic acid, phosphotungstic acid and their salts. Preferably ammonium oxides and salts are used, such as ammonium molybdate, ammonium heptamolybdate and ammonium tungstate.

The catalyst of the present invention can contain a non-noble metal of Group VIII and preferably cobalt and nickel. Advantageously, the following combinations of the non-noble elements of Groups VI and VIII are used: nickel-molybdenum, cobalt-molybdenum, iron-molybdenum, iron-tungsten, nickel-tungsten, cobalt-tungsten, the preferred combinations are: nickel-molybdenum, nickel-tungsten. It is also possible to use combinations of three metals for example nickel-cobalt-molybdenum.

The sources of elements of Group VIII which can be used are well known to a person skilled in the art. For example, nitrates, sulphates, phosphates, halides will be used, for example chlorides, bromides and fluorides, carboxylates for example acetates and carbonates.

When the hydrogenating function is provided by a non-noble metal of Group VIII or a combination of a non-noble metal of Group VIII and a metal of Group VIB, the composition of the support constituted by at least one matrix and zeolites described in the invention is the same as that described previously and, the content by weight of at least one element chosen from the non-noble elements of Group VIB and Group VIII is between 0.1 and 60%, preferably between 1 and 50% and still more preferably between 2 and 40%.

Generally, in order to conclude the preparation of the catalyst, the moist solid is left to rest under a moist atmosphere at a temperature between 10 and 80° C., then the moist solid obtained is dried at a temperature between 60 and 150° C., and finally the solid obtained is calcined at a temperature between 150 and 800° C., generally between 250 and 600° C.

The catalysts of the present invention can also be subjected to a sulphurization treatment making it possible to convert, at least in part, the metal elements to sulphur before they are brought into contact with a charge to be treated. This activation treatment by sulphurizing is well known to a person skilled in the art and can be carried out by any method already described in the literature.

In the case of the non-noble metals, a standard sulphurizing treatment well known to a person skilled in the art consists of heating in the presence or under flow of a hydrogen/hydrogen sulphide mixture or also under pure hydrogen sulphide, at a temperature between 150 and 800° C., preferably between 250 and 600° C., generally in a crossed-bed reaction zone.

Charges

The process makes it possible to convert a charge having a high pour point to a product having a lower pour point. It is therefore applicable for reducing the pour point of the gasoils for example. It also makes it possible to reduce the pour point of heavier charges in order to obtain oil bases having good cold properties and a high viscosity index.

The charges which can be treated according to the process of the invention are advantageously fractions having relatively high pour points the value of which it is wished to reduce.

Typical charges which can be treated advantageously according to the invention generally have a pour point above 0° C. The products resulting from the treatment according to the process have pour points below 0° C. and preferably below approximately −10° C.

These charges preferably contain at least 20% by volume of compounds boiling above 340° C., preferably at least 350° C. and advantageously at least 380° C. In the latter example, this does not mean that the boiling point is 380° C. and above, but 380° C. or above.

The process according to the invention is particularly suitable for treating paraffin distillates such as middle distillates which include gasoils, kerosenes, jet fuels, vacuum distillates and any other fractions the pour point and viscosity of which must be adapted in order to come within the scope of the specifications.

The charges which can be treated according to the process of the invention contain paraffins, olefins, naphthenes, aromatics and also possibly organic nitrogen, sulphur and oxygen compounds.

The charge can also be for example distillates resulting from the direct distillation of crude oil or conversion units such as FCCs, cokers or viscoreducers, or from aromatics extraction units, or from the desulphurization or hydroconversion of ATRs (atmospheric residues) and/or VRs (vacuum residues), or also the charge can be a deasphalted oil, or also a hydrocracking residue for example resulting from a hydrocracking stage, a vacuum distillate having undergone a hydrorefining stage, and more generally bases for lubricating oils, or also poly-alpha-olefins with a high pour point or any mixture of the abovementioned charges.

The paraffins resulting from the Fischer-Tropsch process are excluded.

The charge to be treated preferably has a nitrogen compounds content below approximately 200 ppm by weight and preferably below 100 ppm by weight. The sulphur content is below 1000 ppm by weight, preferably below 500 ppm by weight, and still more preferably below 200 ppm by weight. The metals content of the charge, such as Ni or V, is extremely small, i.e. below 50 ppm by weight, preferably below 10 ppm by weight and still more preferably below 2 ppm by weight.

The use of the catalyst according to the invention under the conditions described below makes it possible in particular to produce products with a low pour point with good yields, and with a high viscosity index in the case of the heaviest fractions which are treated with a view to producing oil bases.

Operating Conditions

The operating conditions under which the catalytic dewaxing process of the invention is carried out are the following:

the reaction temperature is between 200 and 450° C. and preferably between 200 and 430° C., advantageously 250-420° C.;

the pressure is between 0.1 and 25 MPa and preferably between approximately 1 and 20 MPa.

the hourly volume rate (hvr expressed as volume of charge injected per volume unit of catalyst per hour) is between approximately 0.05 and approximately 30 $h^{-1}$ and preferably between approximately 0.1 and approximately 20 $h^{-1}$ and still more preferably between approximately 0.1 and approximately 10 $h^{-1}$.

The contact between the charge and the catalyst is carried out in the presence of hydrogen. The level of hydrogen used and expressed in liters of hydrogen per liter of charge is between 50 and approximately 2000 liters of hydrogen per liter of charge and preferably between 100 and 1500 normal liters of hydrogen per liter of charge.

EMBODIMENT

The catalytic dewaxing process according to the invention can be preceded by a hydroisomerization-hydroconversion stage in the presence of a catalyst containing at least one noble metal applied to an amorphous acid support.

This hydroisomerization-hydroconversion stage is optionally preceded by a hydrorefining stage, which hydrorefining stage can be followed by an intermediate separation.

The hydroisomerization-hydroconversion stage takes place in the presence of hydrogen and in the presence of a bifunctional catalyst comprising an amorphous acid support (preferably an amorphous silica-alumina) and a hydro-dehydrogenating metal function provided by at least one noble metal of Group VIII.

The support is called amorphous, i.e. having no molecular sieve, and in particular zeolite, as well as the catalyst. The amorphous acid support is advantageously an amorphous silica-alumina, but other supports can be used. When it is a silica-alumina, the catalyst, generally, does not contain an added halogen, other that that which could be introduced for the impregnation, of the noble metal for example. The silica-alumina can be obtained by any synthesis technique known to a person skilled in the art such as the techniques of co-precipitation, cogelation, etc.

During the hydroisomerization-hydroconversion stage, the molecules of the charge to be treated, for example n-paraffins, in the presence of a bifunctional catalyst undergo an isomerization then optionally a hydrocracking in order to lead respectively to the formation of isoparaffins and lighter cracking products such as gasoils and kerosene. The conversion of the products having boiling points above or equal to the initial boiling point of the charge which is at least 340° C., or even 370° C. or, still better, at least 380° C., to products with boiling points below the initial boiling temperature of the charge generally varies between 5 and 90%, preferably between 5 and 80%, but is generally preferably below 80% and still better below 60%.

In a preferred embodiment of the invention, a catalyst is used comprising a particular silica-alumina which makes it possible to obtain catalysts which are very active but also very selective in the isomerization of charges such as defined previously.

The characteristics of the pretreatment catalyst are described in more detail below:

The preferred support used for preparation of the catalyst for pretreatment described within the scope of this patent is composed of silica $SiO_2$ and alumina $Al_2O_3$ The silica content of the support, expressed as a percentage by weight, is generally between 1 and 95%, advantageously even between 5 and 95% and preferably between 10 and 80% and still more preferably between 20 and 70% and between 22 and 45%. This silica content is perfectly measured by X-ray fluorescence.

For this particular type of reaction, the metal function is provided by a noble metal of Group VIII of the periodic table of the elements and more particularly platinum and/or palladium.

The noble metal content, expressed as a percentage by weight of metal relative to catalyst, is generally between 0.05 and 10, and more preferably between 0.1 and 5.

The preparation and shaping of the support, and in particular of the silica-alumina is done by usual methods known to a person skilled in the art. Advantageously, prior to the impregnation of the metal, the support can undergo a calcination such as for example a heat treatment at 300-750° C. (600° C. preferred) for 0.25-10 hours (2 hours preferred) under 0-30% volume of water vapour (for silica-alumina 7.5% preferred).

The noble metal salt is introduced by one of the usual methods used to apply the metal (preferably platinum and/or palladium, platinum being further preferred) to the surface of a support. One of the preferred methods is dry impregnation which consists of the introduction of the metal salt into a volume of solution which is equal to the pore volume of the mass of catalyst to be impregnated. Before the reduction operation, the catalyst can undergo a calcination such as for example a treatment under dry air at 300-750° C. (520° C. preferred) for 0.25-10 hours (2 hours preferred).

Before use in the hydroisomerization-conversion reaction, the metal contained in the catalyst must be reduced. One of the preferred methods of carrying out the metal reduction is treatment under hydrogen at a temperature between 150 and 160° C. and a total pressure between 0.1 and 25 MPa. For example a reduction consists of a 2-hour plateau at 150° C. then a rise in temperature to 450° C. at a rate of 1° C./minute then a 2-hour plateau at 450° C.: throughout this reduction stage, the hydrogen flow rate is 1000 liters of hydrogen per liter of catalyst. It should also be noted that any ex situ reduction method is suitable.

The operating conditions under which the hydroisomerization-hydroconversion stage is carried out are important.

Pressure will be maintained between 2 and 25 MPa and preferably between 3 and 20 MPa and advantageously between 2 and 18 MPa, the space velocity is between 0.1 h$^{-1}$ and 10 h$^{-1}$, preferably between 0.2 h$^{-1}$ and 10 h$^{-1}$, and advantageously between 0.5 h$^{-1}$ and 5.0 h$^{-1}$. The hydrogen level is between 100 and 2000 liters of hydrogen per liter of charge and preferably between 150 and 1500 liters of hydrogen per liter of charge.

The temperature used in this stage is between 200 and 450° C. and preferably between 250° C. and 450° C., advantageously between 300° C. and 450° C., and still more advantageously above 340° C., for example between 320 and 450° C.

The two hydrorefining and hydroisomerization-hydroconversion stages can be carried out on the two types of catalysts in (two or more) different reactors, and/or on at least two catalytic beds installed in the same reactor.

The use of the catalyst described above in the hydroisomerization-hydroconversion stage has the effect of increasing the isomerization rate of the heavy fraction (340° C.$^+$, or also 370° C.$^+$ and better still 380° C.$^+$), reducing its pour point and increasing its VI. More generally, it is found that the treatment of the hydroisomerization-hydroconversion stage then makes it possible to obtain better yields of dewaxed oil fraction which will be obtained in the catalytic dewaxing stage.

In one embodiment, all of the effluent from the hydroisomerization-conversion stage can be treated in the dewaxing process according to the invention. The hydrogen can be separated beforehand. The embodiment, with passage into the catalytic dewaxing stage of all of the effluent from the hydroisomerization-hydroconversion stage, is economically beneficial, since one single distillation unit is used at the end of the process. Moreover, at the final distillation (after catalytic dewaxing or subsequent treatments) a gasoil for very cold weather is obtained.

In a variant, it could be subjected to a separation of at least part (and preferably at least a major part) of light gases which include hydrogen and optionally also hydrocarbon compounds with at most 4 carbon atoms.

Advantageously, in another embodiment, the effluent from the hydroisomerization-conversion stage is distilled in order to separate light gases and also separate at least one residue containing compounds having a boiling point above at least 340° C. This is preferably an atmospheric distillation.

Distillation can advantageously be carried out in order to obtain several fractions (gasoline, kerosene, gasoil for example) having a boiling point of at most 340° C. and a fraction (called residue) having an initial boiling point above at least 340° C. and still better 350° C. and preferably at least 370° C. or 380° C.

According to a preferred variant of the invention, this fraction (residue) will then be treated in the catalytic dewaxing stage, i.e. without undergoing vacuum distillation. But in another variant, a vacuum distillation can be used.

Generally, the term middle distillates refers to fraction(s) with an initial boiling point of at least 150° C. and final boiling point, ranging to just before the residue, i.e. generally up to 340° C., 350° C. or preferably below 370° C. or 380° C.

The effluent from the hydroisomerization-hydroconversion stage, can undergo, before or after distillation, other treatments such as for example extraction of at least some of the aromatic compounds.

At least part of the effluent from the hydroisomerization-hydroconversion stage, which effluent has optionally undergone the separations and/or treatments described above, is then subjected to the catalytic dewaxing process according to the invention.

It should be noted that compounds boiling above at least 340° C. are always subjected to the catalytic dewaxing.

The effluent on leaving the hydrodewaxing stage according to the invention is advantageously sent into the distillation train, which preferably integrates an atmospheric distillation and vacuum distillation section, which serves to separate conversion products with a boiling point below 340° C. and preferably below 370° C., (and including in particular those formed during the catalytic dewaxing stage), and separate the fraction which constitutes the oil base and the initial boiling point of which is above at least 340° C. and preferably above or equal to 370° C.

Moreover, this vacuum distillation section makes it possible to separate the different grades of oil.

Preferably, before being distilled, the effluent leaving the catalytic hydrodewaxing process according to the invention is, at least partly and preferably wholly, sent onto a hydrofinishing catalyst in the presence of hydrogen so as to realize accelerated hydrogenation of the aromatic compounds that may still be present which impair the stability of the oils and distillates. However, the acidity of the catalyst must be weak enough not to lead to the formation of cracking product with a boiling point below 340° C. so as not to degrade the final yields in particular of oils.

The catalyst used in this hydrofinishing stage comprises at least one metal of Group VIII and/or at least one element of Group VIB of the periodic table. The strong metal functions:

platinum and/or palladium, or nickel-tungsten, nickel-molybdenum combinations, will be advantageously used in order to carry out accelerated hydrogenation of the aromatics.

These metals are deposited and dispersed on an amorphous or crystalline oxide-type support, such as for example, aluminas, silicas, silica-aluminas.

The hydrofinishing (HDF) catalyst can also contain at least one element of Group VII A of the periodic table of the elements. Preferably these catalysts contain fluorine and/or chlorine.

The contents by weight of metals are between 10 and 30% in the case of non-noble metals and below 2%, preferably between 0.1 and 1.5% and still more preferably between 0.1 and 1.0% in the case of noble metals.

The total halogen, quantity is between 0.02 and 30% by weight, advantageously between 0.1 and 15%, or still more advantageously between 0.1 and 10%, preferably 0.01 to 5%.

Among the catalysts which can be used in this hydrofinishing stage, and leading to excellent performance values, and in particular in order to obtain medicinal oils, there can be mentioned catalysts containing at least one noble metal of Group VIII (platinum and VIII for example) and at least one halogen (chlorine and/or fluorine), the combination of chlorine and fluorine being preferred.

The operating conditions under which the hydrofinishing stage optionally following the catalytic hydrodewaxing process of the invention is carried out are the following:

the reaction temperature is between 180 and 400° C. and preferably between 210 and 350° C., advantageously 230-320° C.;

the pressure is between 0.1 and 25 MPa and preferably between 1.0 and 20 MPa;

the hourly volume rate (hvr expressed as volume of charge injected per volume unit of catalyst per hour) is between approximately 0.05 and approximately 100 and preferably between approximately 0.1 and approximately 30 $h^{-1}$.

The contact between the charge and the catalyst is carried out in the presence of hydrogen. The amount of hydrogen used and expressed in liters of hydrogen per liter of charge is between 50 and approximately 2000 liters of hydrogen per liter of charge and preferably between 100 and 1500 normal liters of hydrogen per liter of charge.

Advantageously, the temperature of the hydrofinishing (HDF) stage is below the temperature of the catalytic hydrodewaxing (CHDW) stage. The difference $T_{CHDW}-T_{HDF}$ is generally between 20 and 200° C., and preferably between 30 and 100° C.

The effluent leaving the HDF section is then sent into the distillation train.

In the variant of the process according to the invention including a preliminary hydroisomerization-hydroconversion stage, the oil bases obtained in a process as described above have a pour point below −10° C., a VI above 95, preferably above 110 and still more preferably above 120, a viscosity of at least 3.0 cSt at 100° C., an ASTM colour below 1 and a UV stability such that the increase in the ASTM colour is between 0 and 4 and preferably between 0.5 and 2.5.

The UV stability test, adapted from ASTM methods D925-55 and D1148-55, provides a quick method of comparing the stability of the lubricating oils exposed to a source of ultraviolet radiation. The test chamber is constituted by a metal enclosure equipped with a turntable which receives the oil samples. A bulb producing the same ultraviolet rays as those of sunlight and placed at the top of the test chamber is directed downwards onto the samples. Among the samples is included a standard oil with known UV characteristics. The ASTM D1500 colour of the samples is determined at t=0 then after 45 hours of exposure at 55° C. The results are transcribed for the standard sample and the test samples as follows:

a) initial ASTM D1500 colour,
b) final ASTM D1500 colour,
c) increase in colour,
d) cloudiness,
e) precipitate.

Another advantage of this variant of the process according to the invention is that it is possible to achieve very low aromatics contents, below 2% by weight, preferably 1% by weight and, better, below 0.05% by weight) and even to produce white oils of medicinal quality having aromatics contents below 0.01% by weight. These oils have UV absorbance values of 275, 295 and 300 nanometres respectively of less than 0.8, 0.4 and 0.3 (ASTM method D2008) and a Saybolt colour between 0 and 30.

In particularly interesting fashion therefore, the process according to the invention also makes it possible to obtain medicinal white oils. Medicinal white oils are mineral oils obtained by accelerated refining of petroleum, their quality is subject to different regulations aimed at guaranteeing their harmlessness for pharmaceutical applications, they are non-toxic and are characterized by their density and their viscosity. Medicinal white oils essentially comprise saturated hydrocarbons, they are chemically inert and their aromatic hydrocarbons content is low. Particular attention is given to the aromatic compounds and in particular those with 6 polycyclic aromatic hydrocarbons (English abbreviation: PAHs) which are toxic and present in concentrations of one part per billion by weight of aromatic compounds in white oil. The total aromatic contents can be monitored using ASTM method D 2008, this UV adsorption test at 275, 292 and 300 nanometres makes it possible to monitor an absorbance below respectively 0.8, 0.4 and 0.3 (i.e. the white oils have aromatics contents below 0.01% by weight). These measurements are carried out with concentrations of 1 g of oil per liter, in a 1 cm container. Marketed white oils differ in terms of their viscosity but also their original crude oil which can be paraffinic or naphthenic, these two parameters will cause differences both in the physico-chemical properties of the white oils in question but also in their chemical composition.

The examples which follow illustrate the invention without however limiting its scope.

EXAMPLE 1

Preparation of Catalyst C1 According to the Invention

Catalyst C1 comprises a ZSM-22 zeolite and a ZBM-30 zeolite. This catalyst is obtained according to the procedure described below.

The ZSM-22 zeolite is obtained according to the synthesis method described in the article of Applied Catalysis, 1989, 48, page 137 and the ZBM-30 zeolite is synthesized according to the BASF patent EP-A-46504 with the organic structuring agent triethylenetetramine.

The synthesis crude ZSM-22 and ZBM-30 zeolites are subjected to a calcination at 550° C. under dry air flow for 12 hours. Then the ZSM-22 solid obtained is subjected to 4 successive ion exchanges in a solution of $NH_4NO_3$ 10N, at approximately 100° C. for 4 hours for each exchange.

The H-ZSM-22 zeolite in acid form thus obtained has an Si/Al ratio=30 and an Na/Al ratio=0.003. The H-ZBM-30 zeolite (acid form) thus obtained has an Si/Al ratio of 45 and an Na/Al ratio below 0.001.

Then 30 grams of H-ZSM-22 zeolite in powder form are mixed with 70 grams of H-ZBM-30 zeolite. Then the mixture of the two zeolites is mixed with an SB3 type alumina gel (provided by Condéa) previously peptized with an aqueous solution containing 68% nitric acid by weight and mixed for 15 minutes. The mixed paste (alumina gel+zeolites) is then extruded through a die with a diameter of 1.4 mm. The extrudates thus obtained are calcined at 500° C. for 2 hours under air. The ZSM-22 zeolite content by weight in the support extrudates is 24% and that of the H-ZBM-30 zeolite is 56% i.e. an overall zeolite content of 80% by weight.

Then, the support extrudates are subjected to a stage of dry impregnation by an aqueous solution of platinum salt $Pt(NH_3)_4{}^{2+}$, $20H^-$ then calcined under dry air at 550° C. The platinum content by weight of the thus-obtained catalyst C1 is 0.48%.

EXAMPLE 2

Use of Catalyst C1 for Improving the Pour Point of a Hydrocracking Residue

The catalyst C1 the preparation of which is described in Example 1 is used for preparing an oil base from the charge described in Table 1, which is a hydrocracking residue from a vacuum distillate.

TABLE 1

Characteristics of the charge

| | |
|---|---|
| Sulphur content (ppm by weight) | 8 |
| Nitrogen content (ppm by weight) | 1 |
| Pour point (° C.) | +40 |
| Initial point | 281 |
| 10% | 348 |
| 50% | 418 |
| 90% | 505 |
| Final point | 583 |

The catalyst is reduced beforehand under hydrogen at 450° C. before the in situ catalytic test in the reactor. This reduction is carried out with plateaux. It consists of a 2-hour plateau at 150° C. then a rise in temperature to 450° C. at a rate of 1° C./minute then a 2-hour plateau at 450° C. During this reduction protocol, the hydrogen flow rate is 1000 liters of $H_2$ per liter of catalyst.

The reaction takes place at 325° C., under a total pressure of 12 MPa, an hourly volume rate of 1 $h^{-1}$ and a hydrogen flow rate of 1000 liters of $H_2$ per liter of charge.

The characteristics of the oil obtained, 380° C.$^+$ fraction, are shown in Table 2 below.

TABLE 2

| | Catalyst C1 |
|---|---|
| Viscosity Index VI of the 380° C.$^+$ fraction | 134 |
| Pour point of the 380° C.$^+$ fraction (° C.) | −21 |
| Oil yield (380° C.$^+$) (% by weight) | 84.9 |

These examples show the full benefit of using the catalyst according to the invention, which makes it possible to reduce the pour point of the initial charge, in this case a hydrocracking residue, while still retaining a high viscosity index (VI).

EXAMPLE 3

Preparation of Catalyst C2 for Pretreatment by Hydroconversion-Hydroisomerization of the Charge Subjected to Dewaxing Catalyst C2 for pretreatment by hydroconversion-hydroisomerization is prepared from a silica-alumina support used in the form of extrudates. It contains 40% by weight of silica ($SiO_2$) and 60% by weight of alumina ($Al_2O_3$). The silica-alumina before addition of the noble metal has a surface area of 332 $m^2/g$ and its total pore volume is 0.82 ml/g.

The catalyst C2 is obtained after impregnation of the noble metal on the support. The platinum salt $H_2PtCl_6$ is dissolved in a volume of solution corresponding to the total pore volume to be impregnated. The solid is then calcined for 2 hours under air at 500° C. The platinum content is 0.48% by weight. Measured over the catalyst, the BET surface area is equal to 310 $m^2/g$. The dispersion of the platinum measured by $H_2/O_2$ titration is 75%.

EXAMPLE 4

Pretreatment on Catalyst C2 of a Hydrorefined Vacuum Distillate Followed by a Separation and Use of Catalyst C1 in Hydrogen Dewaxing The catalyst the preparation of which is described in Example 3 is used to pretreat a charge which is a previously hydrorefined VGO in order to obtain oil bases. In order to be able to directly use the pretreatment stage catalysts, the charge was therefore hydrorefined beforehand and the chief characteristics obtained of the charge are shown in Table 3 below.

TABLE 3

Characteristics of the charge

| | |
|---|---|
| Sulphur content (ppm by weight) | 3 |
| Nitrogen content (ppm by weight) | 1 |
| Initial point | 335° C. |
| 10% point | 397° C. |
| 50% point | 459° C. |
| 90% point | 537° C. |
| Final point | 600° C. |
| Pour point | +42° C. |
| VI after dewaxing with the solvent methylisobutylketone (MIBK) (−20° C.) | 105 |

This charge was used in order to evaluate catalyst C2 and prepare the charge which will then be hydrodewaxed catalytically on the catalyst C1.

The catalytic test unit comprises a fixed-bed reactor, with upflow of the charge, into which is introduced 80 ml of catalyst C2. This catalyst is then subjected to a pure-hydrogen atmosphere at a pressure of 12 MPa in order to ensure the reduction of the platinum oxide to metal platinum then the charge is finally injected. The total pressure is 12 MPa, the hydrogen flow-rate is 1000 liters of gaseous hydrogen per liter of charge injected, the hourly volume rate is 0.9 $h^{-1}$ and the reaction temperature 335° C. After reaction, the effluents are fractionated to light products (gasoline lp-150° C.), middle distillates (150-380° C.) and residue (380° C.$^+$):

The net conversion achieved under these conditions of the charge to products having boiling points below 380° C. is 32% by weight. The thus-obtained VI of the 380° C.$^+$ fraction after dewaxing with the solvent (−20° C.) by methylisobutylketone (MIBK) is 125, i.e. a 20-point increase in the VI compared with the initial charge. On the other hand, the pour point of the 380° C.$^+$ fraction has fallen only slightly, settling, as it does, at a value of +38° C. compared with +42° C. initially.

The 250-380° C. fraction which corresponds to a gasoil cut and which results from the pretreatment stage converting hydrocracking residue has a pour point of −18° C. and a cetane number of 59, which makes it an excellent gasoil.

The residue (380° C.$^+$ fraction) prepared above is then dewaxed and hydrofinished in a unit comprising two fixed-bed reactors with ascending circulation of the charge ("upflow"), 80 ml of the hydrodewaxing catalyst C1 prepared in Example 1 is introduced into the first reactor and a hydrofinishing catalyst containing 1% by weight Pt, 1% by weight F and 1% by weight C1 on the alumina is introduced into the second reactor.

The catalysts are then subjected to a pure-hydrogen atmosphere at a pressure of 12 MPa in order to ensure the reduction of the platinum oxide to metal platinum then the charge (380° C.$^+$ fraction produced in Example 4) is injected.

The total pressure is 12 MPa, the hydrogen flow-rate is 1000 liters of gaseous hydrogen per liter of charge injected, the hourly volume rate in the first reactor containing C2 is 1.2 h$^{-1}$ and the reaction temperature 330° C. and in the second reactor, containing the hydrofinishing catalyst, the total pressure is the same, except for losses of head, the reaction temperature is 220° C. and all of the effluent from the first reactor circulates at a space velocity of 0.5 h$^{-1}$.

After reaction, the effluents are fractionated to light products (gasoline lp-150° C.), middle distillates (150-380° C.) and residue (380° C.$^+$).

The effluent is recovered then distilled under vacuum. The yields of oil fraction (380° C.$^+$ fraction) as well as the characteristics of the 380° C.$^+$ residue are shown in Table 4 for the charge, for the 380° C.$^+$ fraction from the converting pretreatment stage and for the 380° C.$^+$ fraction from the catalytic dewaxing and hydrofinishing stage.

TABLE 4

| | 1<br>Charge =<br>hydrocracking<br>residue | 2<br>Stage (a)<br>(pretreatment<br>stage) | 3<br>Stage (b)<br>hydrofinishing<br>(catalytic<br>hydrodewaxing +<br>hydrofinishing) |
|---|---|---|---|
| Reaction temperature (° C.) | / | 345 | 330 220 |
| Total pressure (bar) | | 120 | 120 120 |
| Conversion to 380° C.$^-$ (% by weight) | / | 32 | / |
| Sulphur (ppm by weight) | 3 | / | / |
| Nitrogen (ppm by weight) | 1 | / | / |
| 380° C.$^+$ Fraction | | | |
| Pour point (° C.) | +42 | +38 | −21 |

| 380° C.$^+$<br>Fraction<br>after treatment | 380° C.$^+$ Fraction<br>of the<br>hydrocracking<br>residue dewaxed<br>with solvent | 380° C.$^+$ Fraction<br>hydroisomerized<br>and dewaxed with<br>solvent | 380° C.$^+$ Fraction<br>hydroisomerized,<br>catalytically<br>dewaxed and<br>hydrofinished |
|---|---|---|---|
| VI | 105 | 125 | 124 |
| Pour point (° C.) | −20 | −20 | −21 |
| Saybolt colour | / | / | +30 |
| UV absorption (D2008) | | / | |
| 260-280 nm | / | / | 0.0006 |
| 280-290 nm | / | / | 0.0005 |
| 290-300 nm | / | / | 0.0003 |
| 300-360 nm | / | / | 0.0002 |
| 360-400 nm | / | / | <0.0001 |
| 300-330 nm | / | / | 0.0003 |
| 330-350 nm | / | / | <0.0001 |

This example demonstrates that the combination of a stage of pretreatment by hydroconversion-hydroisomerization (stage a) and a stage of catalytic dewaxing followed by hydrofinishing, leads to high-quality products. In particular it shows that stage (a) makes it possible to increase the viscosity index of the oil fraction (380° C.$^+$) from 105 to 125 without sufficiently reducing the pour point (Table 4, columns 1 and 2). This reduction is carried out during stage (b) on the catalytic dewaxing catalyst which makes it possible to obtain a pour point of −21° C. as well as a Saybolt colour of +30 which gives the product the quality of medicinal oil (Table 4, columns 2 and 3).

The entire disclosure of all applications, patents and publications, cited herein and of corresponding French application No. 03/03.531, filed Mar. 24, 2003 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A catalyst comprising (A) at least one TON zeolite molecular sieve chosen from Theta-1, ZSM-22, ISI-1, NU-10 and KZ-2, (B) at least one ZBM-30 zeolite synthesized with triethylenetetramine as a structuring agent (C) at least one hydro-dehydrogenating element, and (D) at least one porous mineral matrix.

2. A catalyst according to claim 1 in which the hydro-dehydrogenating element is chosen from the elements of Group VIB and Group VIII of the periodic table.

3. A catalyst according to claim 2 in which the hydro-dehydrogenating element of Group VTB is molybdenum and/or tungsten.

4. A catalyst according to claim 2 in which the hydro-dehydrogenating element of Group VIII is a noble metal of Group VIII.

5. A catalyst according to claim 4 in which the hydro-dehydrogenating element of Group VIII is platinum and/or palladium.

6. A catalyst according to claim 1 subjected to sulphurization treatment.

7. A process for improving the pour point of a paraffin charge, in which the charge to be treated is brought into contact with a dewaxing catalyst according to claim 1 under hydrodewaxing conditions.

8. A process according to claim 7 in which the treated charge contains at least 20% by volume of compounds boiling above 340° C.

9. A process according to claim 7 in which the operating conditions are the following:
   the reaction temperature is between 200 and 450° C.,
   the pressure is between 0.1 and 25 MPa,
   the hourly volume rate (hvr expressed as volume of charge injected per volume unit of catalyst per hour) is between approximately 0.05 and approximately 30 h$^{-1}$.

10. A process according to claim 7 in which the charge undergoes a hydroisomerization-hydroconversion stage beforehand.

11. A process according to claim 10 in which all of the effluent from the hydroisomerization-conversion stage is sent to the dewaxing catalyst.

12. A process according to claim 10 in which the hydroisomerization-hydroconversion stage is preceded by a hydrorefining stage.

13. A process according to claim 12 in which the hydrorefining stage is followed by an intermediate separation.

14. A process according to claim 7 in which the effluent from the catalytic hydrodewaxing stage is at least partly sent to a hydrofinishing catalyst.

15. A catalyst according to claim 1, wherein the TON zeolite comprises ZSM-22.

16. A catalyst according to claim 15, wherein the hydro-dehydrogenating element comprises platinum.

17. A process for improving the pour point of a paraffin charge, in which the charge to be treated is brought into contact with a dewaxing catalyst according to claim 16 under hydrodewaxing conditions.

18. A process for improving the pour point of a paraffin charge, in which the charge to be treated is brought into contact with a dewaxing catalyst according to claim 15 under hydrodewaxing conditions.

19. A catalyst according to claim 15, further comprising at least one of molybdenum and tungsten.

20. A process for improving the pour point of a paraffin charge, in which the charge to be treated is brought into contact with a dewaxing catalyst according to claim 19 under hydrodewaxing conditions.

* * * * *